United States Patent
Kling

(10) Patent No.: US 9,181,406 B2
(45) Date of Patent: Nov. 10, 2015

(54) PROCESS OF INCORPORATING ADDITIVES INTO VINYLIDENE CHLORIDE POLYMERS WITHOUT THE USE OF A BLENDER

(75) Inventor: Susan M. Kling, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/343,258

(22) PCT Filed: Sep. 13, 2012

(86) PCT No.: PCT/US2012/055018
§ 371 (c)(1),
(2), (4) Date: Mar. 6, 2014

(87) PCT Pub. No.: WO2013/048747
PCT Pub. Date: Apr. 4, 2013

(65) Prior Publication Data
US 2014/0243470 A1    Aug. 28, 2014

Related U.S. Application Data

(60) Provisional application No. 61/539,292, filed on Sep. 26, 2011.

(51) Int. Cl.
*B05D 7/26* (2006.01)
*C08L 27/04* (2006.01)
*C08L 33/18* (2006.01)
*C08J 3/20* (2006.01)
*C08J 3/12* (2006.01)
*C08L 27/08* (2006.01)

(52) U.S. Cl.
CPC *C08J 3/203* (2013.01); *C08J 3/128* (2013.01); *C08L 27/08* (2013.01); *C08J 2327/08* (2013.01)

(58) Field of Classification Search
USPC .......... 524/501, 560, 569; 523/201; 428/407, 428/520, 522, 514, 515; 427/212, 222, 427/385.5
See application file for complete search history.

(56) References Cited

U.S. PATENT DOCUMENTS 6,627,679 B1 * 9/2003 Kling ............................. 523/201

FOREIGN PATENT DOCUMENTS

WO    00/11054 A1    3/2000
WO    2011/110567 A1    9/2011

* cited by examiner

*Primary Examiner* — Robert Harlan
(74) *Attorney, Agent, or Firm* — Whyte Hirschboeck Dudek S.C.

(57) ABSTRACT

Solid additive particles are added to solid vinylidene chloride (VDC) polymer particles by a process comprising the steps of: A. Polymerizing VDC monomer, optionally with one or more mono-ethylenically unsaturated comonomers, in a polymerization zone under polymerization conditions to form solid VDC polymer particles; B. Stopping the polymerization of the VDC monomers after formation of the solid VDC polymer particles; and C. Contacting the solid VDC polymer particles with the solid additive particles (i) before the solid VDC polymer particles are de-watered, and (ii) at a temperature sufficient to melt or soften the solid additives particles but insufficient to melt or soften the solid VDC polymer particles such that the melted or softened solid additive particles adhere to the solid VDC polymer particles upon contact.

12 Claims, No Drawings

PROCESS OF INCORPORATING ADDITIVES INTO VINYLIDENE CHLORIDE POLYMERS WITHOUT THE USE OF A BLENDER

CROSS REFERENCE TO RELATED APPLICATION

The present application is the national phase of PCT Patent Application No. PCT/US2012/055018 filed Sep. 13, 2012, which claims priority to U.S. Provisional Application No. 61/539,292, filed Sep. 26, 2011, the entire content of which is incorporated by reference herein.

BACKGROUND OF THE INVENTION

1. Field of the Invention

This invention relates to vinylidene chloride (VDC) polymers. In one aspect, the invention relates to the incorporation of solid additives into the polymer while in another aspect, the invention relates to the incorporation of solid additives into VDC polymers without the use of a blender.

2. Description of the Related Art

Many VDC polymers require processing aids and other additives for efficient and successful extrusion. Liquid additives, e.g., various plasticizers, can be added as part of the monomer feed to the process for making the polymer. Many solid additives, e.g., lubricants, however, can not be added to the process for making the polymer, and thus are typically added to the finished polymer after it has been recovered, de-watered and dried. Depending upon the process equipment, this addition can take one or more of several forms, e.g., addition of multiple additives one-at-a-time, blending multiple additives into a premix or masterbatch, etc.

SUMMARY OF THE INVENTION

In one embodiment the invention is a process for blending solid additive particles with solid VDC polymer particles, the process comprising the steps of:

A. Polymerizing VDC monomer, optionally with one or more mono-ethylenically unsaturated comonomers, in a polymerization zone under polymerization conditions to form solid VDC polymer particles;

B. Stopping the polymerization of the VDC monomers after formation of the solid VDC polymer particles; and C. Contacting the solid VDC polymer particles with the solid additive particles (i) before the solid VDC polymer particles are de-watered, and (ii) at a temperature sufficient to melt or soften at least some of the solid additives particles but insufficient to melt or soften the solid VDC polymer particles such that the melted or softened solid additive particles adhere to the solid VDC polymer particles upon contact.

In one embodiment the solid additive particles are contacted with the solid VDC polymer particles in the polymerization zone, i.e., the reactor in which the solid VDC polymer particles are formed. In one embodiment the solid additive particles are contacted with the solid VDC polymer particles in a stripper zone to which the solid VDC polymer particles have been transferred for separation from residual monomer.

In one embodiment the solid additive particles are contacted with the solid VDC polymer particles before, during and/or after the stripping of residual monomer from the solid VDC polymer particles. In one embodiment the solid additive particles are contacted with the solid VDC polymer particles in a contact zone outside of both the polymerization zone and residual monomer stripper zone.

DETAILED DESCRIPTION OF THE PREFERRED EMBODIMENT

Definitions

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, etc., is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For-ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges in this disclosure are provided for, among other things, the temperature and pressure conditions for the polymerization of VDC monomer, optionally with one or more mono-ethylenically unsaturated comonomers.

The term "comprising" is synonymous with "including," "containing," "having" or "characterized by," is inclusive or open-ended, and does not exclude additional, unrecited elements, material, or steps. The term "consisting essentially of" indicates that in addition to specified elements, materials, or steps; elements, unrecited materials or steps may be present in amounts that do not unacceptably materially affect at least one basic and novel characteristic of the subject matter. The term "consisting of" indicates that only stated elements, materials or steps are present.

"Composition", "formulation" and like terms means a mixture or blend of two or more components. In the context of a mix or blend of materials from which barrier packing, e.g., film, is made, the composition includes the blend of the invention and any other additives, fillers and the like.

"Polymer" means the polymerization product of one or more monomers and is inclusive of homopolymers as well as interpolymers, copolymers, terpolymers, tetrapolymers, and the like and blends and modifications of any of the foregoing, including block, graft, addition or condensation forms of polymers.

"Mer", "mer unit" and like terms means that portion of a polymer derived from a single reactant molecule; for example, a mer unit from ethylene has the general formula —$CH_2CH_2$—.

"Interpolymer" or "copolymer" refers to a polymer that includes mer units derived from at least two reactants (normally monomers) and is inclusive of random, block, segmented, graft, and the like copolymers, as well as terpolymers, tetrapolymers, and trimers and oligomers.

"Polymerization conditions" and like terms mean the conditions under which monomers will react to form a polymer comprising mer units derived from the monomers. The monomers can be the same or different, and the conditions include, but are not limited to, temperature; pressure; agitation, residence time; solvents, initiators, surfactants, suspending agents, catalysts and the like.

"Molecular weight" is the weight average molecular weight (Mw) in Daltons. It is measured by size exclusion chromatography using polystyrene calibration. Sample preparation includes dissolving a polyvinylidene chloride resin sample in tetrahydrofuran (THF) at 50° C. Resin samples containing more than about 94 percent vinylidene chloride do not readily dissolve at this temperature, and dissolving at elevated temperature can result in degradation of the polymer molecular weight. Therefore, resin samples containing more than about 94 percent vinylidene chloride are pre-dissolved as a 1 percent (%) solution, in inhibited THF at 63° C. Samples can be dissolved at up to 83° C. for 4 hours without loss of molecular weight, though minimizing dissolving time and temperature is desirable. The polymers are then analyzed for determination of molecular weight by gel permeation chromatography (GPC) using the Polymer Laboratories Software on a Hewlett Packard 1100 chromatograph equipped with two columns in series. These columns contain 5 µm styrene/divinylbenzene copolymer beads commercially available from Polymer Laboratories under the trade designation PLGel 5µ MIXED-C. The solvent is nitrogen purged HPLC Grade THF. The flow rate is 1.0 milliliter/minute and the injection size is 50 microliters. The molecular weight determination is deduced by using ten narrow molecular weight distribution polystyrene standards (commercially available from Polymer Labs under the trade designation Narrow PS set (about. 3,000,000 to 2000 Mp)) in conjunction with their elution volumes.

"Melting point" and like terms mean the property of a solid material corresponding to the transition from a solid to liquid material. Such properties can be readily measured by differential scanning calorimeter (DSC) as the glass transition temperature (Tg) for amorphous glassy materials and melting temperature for crystalline or semi-crystalline materials.

"Softening point" and like terms mean the temperature of a material at which it begins to significantly soften and become tacky. In the context of this invention, the softening point is the temperature at which a given material begins to adhere to the VDC resin.

Polymerization Step

The first step of the process of this invention is the manufacture of solid VDC polymer particles. Typically this is accomplished through batch suspension polymerization which is well known in the art and which typically produces dense beads. The size and size distribution of these particles are not important to this invention. Emulsion polymerization could also be used but since this typically produces a product in latex form, the VDC polymer would first have to be converted to solid particles before contact with the solid additive particles.

The polymerization comprises contacting VDC monomers, either alone for a VDC homopolymer or with one or more comonomers for a VDC interpolymer, in a polymerization zone and under polymerization conditions. The polymerization zone can be a reactor of any design, typically a closed, stirred, glass lined vessel that is jacketed for heating and cooling. Depending on the specific composition and molecular weight of the resin being produced, the polymerization conditions can vary widely. Even within one polymerization a range of temperatures and pressures can be used. The polymerization conditions typically include a temperature of 35 to 90° C. and a pressure of atmospheric up to 900 kPa. The reaction mass comprises monomers, water and typically one or more of an initiator and a surfactant or suspending agent. The reaction mass is typically well agitated, e.g., stirred, essentially free of metallic impurities, and purged of and sequestered from oxygen. The polymerization can be batch, semi-continuous or continuous.

The VDC interpolymers of this invention typically comprise a majority of mer units derived from VDC monomer and a minority of mer units derived from one or more mono-ethylenically unsaturated comonomers. The mer units derived from one or more these comonomers are typically present in an amount of not greater than 40, more typically not greater than 25 and even more typically not greater than 16, and still more typically not greater than 10 mole percent of the interpolymer. The mer units derived from one or more of these comonomers are typically present in an amount greater than zero, more typically greater than 1, even more typically greater than 2 and still more typically greater than 3, mole percent of the interpolymer. The balance of the mer units in the VDC polymer are mer units derived from VDC monomer.

Mono-ethylenically unsaturated comonomers suitable for use in the polymerization step of the present invention include vinyl chloride, alkyl acrylates, alkyl methacrylates, acrylic acid, methacrylic acid, itaconic acid, acrylonitrile, and methacrylonitrile. The mono-ethylenically unsaturated monomers are typically selected from the group consisting of vinyl chloride, alkyl acrylates and alkyl methacrylates, the alkyl acrylates and alkyl methacrylates having from 1 to 8 carbon atoms per alkyl group. The alkyl acrylates and alkyl methacrylates typically have from 1 to 4 carbon atoms per alkyl group. The alkyl acrylates and alkyl methacrylates are preferably selected from the group consisting of the methyl acrylate, ethyl acrylate, butyl acrylate and methyl methacrylate.

The weight average molecular weight (Mw) of the VDC polymers used in the practice of this invention are typically of 50,000 to 250,000 Daltons, more typically of 70,000 to 130,000 Daltons, as measured by size exclusion chromatography using polystyrene calibration.

Stopping the Polymerization

The second step of the process is to stop the polymerization. In a batch process the progress of the polymerization can be monitored by any conventional means, e.g., heat release or pressure drop, and once a desirable amount of VDC monomer has been converted to the VDC polymer, e.g., greater than 65%, preferably greater than 75% and more preferably greater than 85%, the polymerization is stopped by any conventional means, e.g., venting unreacted monomer, adding free radical scavenger, cooling and the like. In a continuous process the polymerization is typically stopped simply by closing the flow of monomers to the reaction zone.

At the time the polymerization is stopped, the contents of the polymerization zone comprises, among other things, solid VDC polymer particles, by-products, unreacted monomer and water all at or near the polymerization temperature.

Recovery of the VDC Polymer

After the polymerization process is stopped, the VDC polymer is recovered. Typically the first step of the recovery is stripping unreacted or residual monomer from the solid VDC particles. Stripping is typically accomplished by subjecting the reaction mass to vacuum either in the polymerization vessel or, more commonly, in a residual monomer stripping vessel. Once the residual monomers have been stripped, the reaction mass is de-watered and dried.

Additive Addition

The contacting of the solid additive particles with the solid VDC polymer particles can be practiced at any one of a number of different stages in the process so long as the contacting is conducted (i) after the polymerization step is stopped and before the solid VDC polymer particles are de-watered, and (ii) at a temperature sufficient to melt or soften the solid additive particles but not the solid VDC polymer particles so that the melted or softened additive particles will adhere to the solid VDC polymer particles upon contact. Regarding the temperature, typically the contacting temperature is at or near the polymerization temperature, e.g., 60 to 120, more typically of 70 to 110 and even more typically of 80 to 100, ° C. This temperature will depend, in part, upon the nature of the VDC polymer, e.g., homopolymer, copolymer, morphology, size, molecular weight, etc., and, in part, upon the nature of the solid additive particles, e.g., chemical composition, morphology, size, molecular weight, etc. Like the solid VDC polymer particles, the morphology, size and size distribution of the solid additive particles is not important to this invention although preferably the size of the additive particles is similar to or smaller than the size of the VDC resin particles. Of course, if the particles of a particular additive have a melting or softening point greater than the melting point of the solid VDC polymer particles, then these particles will not readily adhere to the solid VDC particles upon contact and are thus disfavored for use in this process. Temperatures at or above which the solid VDC polymer particles melt or soften are not favored because at such temperatures, the VDC polymer particles will tend to adhere to one another creating unwanted aggregates that can interfere with the further processing and/or ultimate use, e.g., extrusion, of the polymer.

Regarding the stage and location of the contacting of the solid additive particles with the solid VDC polymer particles, this can occur in the polymerization zone, e.g., reaction vessel, the residual monomer stripping zone or vessel, or a zone or vessel to which the solid VDC polymer particles are transferred after residual monomer is stripped but before water is removed. Regardless of the location, the contacting can occur before, during and/or after the residual monomers are stripped.

In one embodiment the solid additive particles are dry added by shot addition or semi-continuous feeder onto the solid VDC polymer particles while the solid VDC polymer particles are under constant and thorough agitation. In one embodiment, the additives are pre-mixed before they are added to the VDC polymer particles. In one embodiment, the solid additive particles are added at one time or in installments, and the solid additives particles in combination with the solid VDC polymer particles are maintained in a constant stirred mix for a period of time sufficient to ensure complete or near complete and uniform or near uniform distribution of the additive particles across the VDC polymer particles. The completeness of the mixing can be monitored by a number of different means including microscopic examination of the additive-coated VDC polymer particles or a mill roll stickiness evaluation test.

Additives

The additives that can be used in the practice of this invention are solid at ambient conditions (23° C., atmospheric pressure) but typically have a melting or softening point lower than that of the solid VDC polymer particles with which they are to be blended with the understanding that not all additives need to melt or soften as long as at least some of the additives do melt or soften sufficiently under contact conditions such that those additives that do melt or soften can act as an adhesive between the VDC resin particles and those additive particles that do not melt or soften. The additives are typically water-insoluble and can possess a wide range of particle sizes, but are typically the same size as or smaller than the size of the VDC polymer particles. Particle size and particle size distribution can be measured by any one of a number of recognized methods including, but not limited to, screening, optical and electrical resistance sizing.

Representative additives that can be used in the practice of this invention include, but are not limited to, antioxidants, light stabilizers, pigments, processing aids, lubricants, acid scavengers, waxes and the like. Such additives are used in known amounts and in known ways. Typically, additives are used in amounts of less than 10, more typically less than 5 and even more typically less than 3, wt % based upon the weight of the composition.

This invention is further illustrated by the following examples. Unless stated otherwise all percentages, parts and ratios are by weight.

Specific Embodiments

A blend of additives and VDC interpolymer of vinylidene chloride methyl acrylate (4.8 wt % methyl acrylate and a weight average molecular weight of 116,000) is made by mixing the blend components, i.e., additives and interpolymer, together using a LITTLEFORD high intensity mixer and conventional blending techniques. This blend is then compared to a blend of the same composition made by adding the dry additives to the VDC interpolymer at the residual monomer stripper of the VDC interpolymer resin manufacturing process. The blend of both the comparative and inventive samples is described in Table 1. The dry additives are solid under ambient conditions (23° C. and atmospheric pressure) and consist of components a-g. Components h and i are liquids under ambient conditions. Some portion of the total amount of each of the h and i components is added to the VDC monomer and the remaining amount of each of the h and i components is added to the VDC interpolymer at the time the interpolymer is made. The amount of each of h and i added to the monomer and interpolymer is not critical and can vary to convenience. Samples of each blend are then run on a BRABENDER two-roll mill, model RM-3000, at 175° C. and 25 revolutions per minute (rpm), and compared for time-to-gassing (i.e., the time at which bubbles of HCl gas are first observed with the unaided eye in the polymer melt caused by polymer degradation) and stickiness. The stickiness scale is reported in Table 2 and example results are reported in Table 3.

TABLE 1

VDC Interpolymer and Additive Blend

| Component | Weight Percent |
|---|---|
| VDC Interpolymer | 93.23 |
| 50/50 HDPE and high molecular weight silicone[a] | 0.15 |
| Paraffin Wax[b] | 0.1 |
| Oxidized polyethylene wax[c] | 0.1 |
| Stearamide[d] | 0.11 |
| Ground Limestone[e] | 0.11 |
| Distearyl Thiodipropionate[f] | 0.15 |
| Euracamide[g] | 0.05 |
| Epoxidized Soybean Oil[h] | 4 |
| Dibutyl Sebacate[i] | 2 |

[a]Lubricant; HDPE = High Density Polyethylene.
[b]Lubricant.
[c]Lubricant
[d]Slip Agent
[e]Antiblock
[f]Antioxidant/Lubricant
[g]Lubricant
[h]Plasticizer
[i]Plasticizer

TABLE 2

Stickiness Scale

| Stickiness Value | Description |
|---|---|
| 0 | No polymer sticking on the boundary roll |
| 1 | Polymer sticking on the boundary roll in small spots |
| 2 | Thin layer of polymer over most of boundary roll |
| 3 | Thin layer of polymer over most of boundary roll with some thick spots |
| 4 | Thick layer of polymer over most of boundary roll |
| 5 | Equal amounts of polymer on both rolls |

TABLE 3

Two-Roll Mill Evaluation of VDC Interpolymer and Additives Blends

| Time-to-Gassing Time (min) | Comparative Example 6:43 Stickiness | Inventive Example 6:22 Stickiness |
|---|---|---|
| 3 | 4 | 2 |
| 6 | 4 | 3 |
| 9 | 4 | 3 |
| 12 | 4 | 3.5 |
| 15 | 4 | 4 |
| 18 | | 5 |
| 21 | | 5 |
| 24 | | 5 |
| 27 | | 5 |

The time-to-gassing is similar for both blends, and the lower sticking values at 3-12 minutes indicate less sticking for the inventive blend than for the conventional (comparative) blend. Both of these results are good and are indicative that blends made by the inventive process are at least as good as blends made by conventional blending techniques.

What is claimed is:

1. A process for blending solid additive particles with solid VDC polymer particles, the process comprising the steps of:
    A. Polymerizing VDC monomer, optionally with one or more mono-ethylenically unsaturated comonomers, in a polymerization zone under polymerization conditions to form solid VDC polymer particles;
    B. Stopping the polymerization of the VDC monomers after formation of the solid VDC polymer particles; and
    C. Contacting the solid VDC polymer particles with the solid additive particles (i) before the solid VDC polymer particles are de-watered, (ii) during and/or after stripping residual monomer from the solid VDC polymer particles, and (iii) at a temperature sufficient to melt or soften the solid additives particles but insufficient to melt or soften the solid VDC polymer particles such that the melted or softened additive particles adhere to the solid VDC polymer particles upon contact.

2. The process of claim 1 in which the solid additive particles are contacted with the solid VDC polymer particles in a residual monomer stripper zone.

3. The process of claim 2 in which the residual monomer stripper zone is separate and apart from the polymerization zone.

4. The process of claim 1 in which the solid additive particles are contacted with the solid VDC polymer particles after the residual monomer is separated from the solid VDC polymer particles.

5. The process of claim 1 in which the solid additive particles are contacted with the solid VDC polymer particles while the residual monomer is separated from the solid VDC polymer particles.

6. The process of claim 1 in which the contacting of Step C is at a temperature of 60 to 120° C.

7. The process of claim 6 in which the solid additive particles are of about the same size or smaller than the size of the VDC polymer particles.

8. The process of claim 7 in which the solid additive particles comprise a mixture of two or more additives.

9. The process of claim 8 in which the solid additive particles comprise at least one of an antioxidant, light stabilizer, pigment, processing aid, lubricant, acid scavenger and wax.

10. The process of claim 9 in which the solid additive particles are contacted with the solid VDC polymer particles in an amount of greater than zero to less than 10 wt % based on the combined weight of the solid VDC and solid additive particles.

11. The process of claim 1, wherein VDC monomer is polymerized in a reaction vessel, and wherein the solid additive particles are contacted with the solid VDC polymer particles in the reaction vessel.

12. The process of claim 1, wherein VDC monomer is polymerized in a reaction vessel, and wherein the solid additive particles are contacted with the solid VDC polymer particles in a second vessel.

* * * * *